(12) United States Patent
O'Connor

(10) Patent No.: US 11,845,060 B2
(45) Date of Patent: Dec. 19, 2023

(54) PROCESS FOR THE PREPARATION OF HOMOGENEOUS HYBRID MATERIALS

(71) Applicant: CLIMEWORKS AG, Zurich (CH)

(72) Inventor: Paul O'Connor, KM Hoevelaken (NL)

(73) Assignee: CLIMEWORKS AG, Zurich (CH)

(*) Notice: Subject to any disclaimer, the term of this patent is extended or adjusted under 35 U.S.C. 154(b) by 209 days.

(21) Appl. No.: 17/059,543

(22) PCT Filed: May 28, 2019

(86) PCT No.: PCT/EP2019/063743
§ 371 (c)(1),
(2) Date: Nov. 30, 2020

(87) PCT Pub. No.: WO2019/229030
PCT Pub. Date: Dec. 5, 2019

(65) Prior Publication Data
US 2021/0205783 A1 Jul. 8, 2021

Related U.S. Application Data

(60) Provisional application No. 62/679,061, filed on Jun. 1, 2018.

(51) Int. Cl.
*B01J 2/30* (2006.01)
*B01J 20/02* (2006.01)
(Continued)

(52) U.S. Cl.
CPC ........... *B01J 20/30* (2013.01); *B01J 20/0277* (2013.01); *B01J 20/08* (2013.01); *B01J 20/20* (2013.01);
(Continued)

(58) Field of Classification Search
CPC ........ B01J 20/30; B01J 20/0277; B01J 20/08; B01J 20/20; B01J 20/24; B01J 20/28023;
(Continued)

(56) References Cited

FOREIGN PATENT DOCUMENTS

| EP | 2 889 400 A1 | 7/2015 |
|---|---|---|
| EP | 3 208 296 A1 | 8/2017 |

(Continued)

OTHER PUBLICATIONS

Chen et al (Synthesis and photocatalytic activity of mesoporous TiO2 nanoparticle using biological renewable resource of unmodified lignin as a template, Microporous and Mesoporous Materials, 2016) (Year: 2016).*

(Continued)

*Primary Examiner* — Colin W. Slifka
*Assistant Examiner* — Logan Edward Laclair
(74) *Attorney, Agent, or Firm* — Sughrue Mion, PLLC

(57) ABSTRACT

The invention relates to a process for the preparation of homogeneous hybrid inorganic-organic materials comprising dissolving and/or suspending and/or dispersing an inorganic and an organic material in a ionic liquid solvent to form an ionic solution and precipitating the inorganic and organic materials together to form a hybrid inorganic-organic precipitate material. The invention further relates to the homogeneous hybrid inorganic-organic precipitate material obtainable or obtained by the process, in particular carbon alumina hybrid material, to shaped articles like fibers and particles comprising said hybrid material and the use thereof for the manufacture of—or as a component in—catalysts, sorbents, building and construction materials, packaging materials, paper materials, coatings and polymers.

27 Claims, 1 Drawing Sheet

(51) Int. Cl.
*B01J 20/08* (2006.01)
*B01J 20/20* (2006.01)
*B01J 20/24* (2006.01)
*B01J 20/28* (2006.01)
*B01J 20/30* (2006.01)

(52) U.S. Cl.
CPC ......... *B01J 20/24* (2013.01); *B01J 20/28023* (2013.01); *B01J 20/3028* (2013.01); *B01J 20/3085* (2013.01); *B01J 2220/42* (2013.01); *B01J 2220/46* (2013.01)

(58) Field of Classification Search
CPC ............... B01J 20/3028; B01J 20/3085; B01J 2220/42; B01J 2220/46; B01J 31/1691; B01J 31/2213; B01J 2531/0216; B01J 2531/31; B01J 37/04; B01J 37/084; B01J 2531/0272; B01J 21/18; B01J 20/06; B01J 35/0013; B01J 35/023; B01J 35/06; Y02C 20/40; B01D 2253/102; B01D 2253/112; B01D 2253/1124; B01D 2253/25; B01D 2257/504
See application file for complete search history.

(56) References Cited

FOREIGN PATENT DOCUMENTS

| WO | 2014/009517 | A1 | | 1/2014 | |
|---|---|---|---|---|---|
| WO | 2016/087186 | A1 | | 6/2016 | |
| WO | 2017/055407 | A1 | | 4/2017 | |
| WO | 2017/148782 | A1 | | 9/2017 | |
| WO | 2017/156256 | A1 | | 9/2017 | |
| WO | WO-2017156256 | A1 | * | 9/2017 | ............. A01N 37/18 |

OTHER PUBLICATIONS

International Search Report of PCT/EP2019/063743 dated Jul. 16, 2019 [PCT/ISA/210].
Written Opinion of PCT/EP2019/063743 dated Jul. 16, 2019 [PCT/ISA/237].
Brinker et al. "Sol-Gel Science The Physics and Chemistry of Sol-Gel Processing" Academic Press, Inc., 1990, pp. i-xiv, 1-908 (463 pages total).
Sanchez et al., "Applications of hybrid organic-inorganic nanocomposites", Journal of Materials Chemistry, vol. 15, 2005, pp. 3559-3592.

* cited by examiner

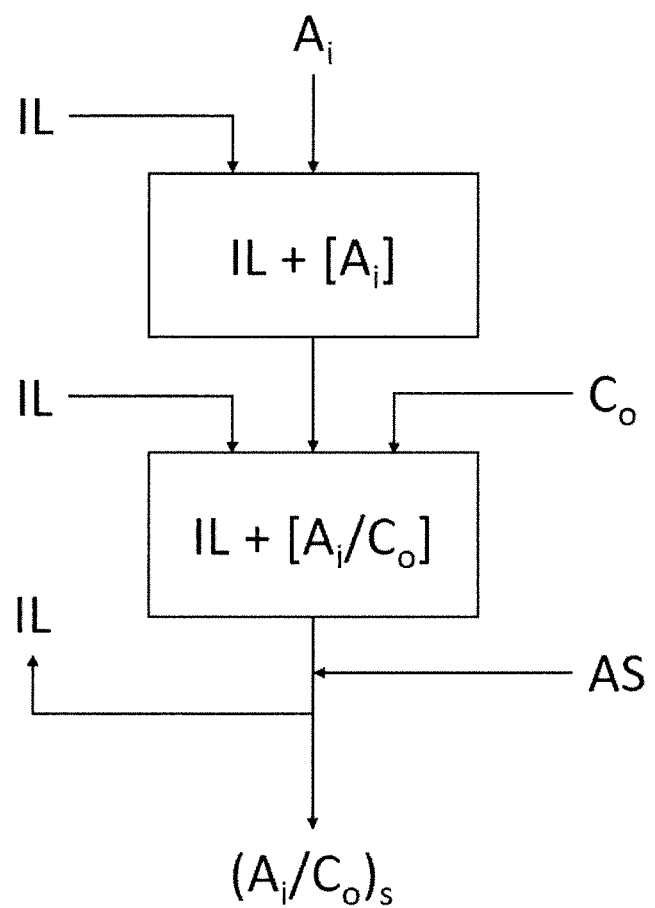

PROCESS FOR THE PREPARATION OF HOMOGENEOUS HYBRID MATERIALS

CROSS REFERENCE TO RELATED APPLICATIONS

This application is a National Stage of International Application No. PCT/EP2019/063743 filed on May 28, 2019, claiming priority based on U.S. Provisional Patent Application No. 62/679,061 filed on Jun. 1, 2018.

BACKGROUND OF THE INVENTION

1. Field of the Invention

The invention relates to a process for the preparation of preferably homogeneous hybrid inorganic-organic materials. In several applications there is a need to combine the properties of certain inorganic materials with organic materials. These so-called "Hybrid" materials may have several applications.

Such hybrids are described La. in Journal of materials chemistry, 2005, volume 15, issue 35-56, pages 3541-3988.

A typical use of these hybrid materials is for instance the combination of the flame-retardant properties of an inorganic component (e.g. Alumina $Al_2O_3$) with the fibrous structure of wood. Another example is in the area of sorbents where the catalytic and/or physical properties of the organic and inorganic components can complement each other. Typical applications of these materials are in catalysts, sorbents, building and construction materials, packaging materials, paper materials, coatings and polymers.

In practice, often physical mixtures are applied and/or coatings for imparting hybrid properties. These materials however cannot be considered homogeneous, as there will be large areas (at the micro meter and millimeter scale) containing mainly one of the two components. The effectiveness of the combination of properties will be therefore less optimal. To achieve a more intimate mixing on the micro and/or even Nanoscale other methods need to be applied, such as high energy milling and mixing also sometimes referred to as mechanochemistry.

For several areas of application, it is of importance to combine the properties of organic and inorganic materials into a preferably homogeneous structure whereby the mixing of the materials is achieved in sub-micron scale or nano-scale or even on molecular scale. Preferably the foregoing should be obtained with the minimum amount of process steps and at the lowest possible energy consumption and processing cost.

2. Description of the Related Art

There are several known methods to prepare hybrid materials. In inorganic chemistry this can e.g. be achieved by precipitation/co-precipitation, also often called sol-gel chemistry. See e.g. "Sol-Gel Science" by Brinker and Scherer (Academic Press, 2013).

In the case of an organic component. Like for instance cellulose, the cellulose needs first to be de-agglomerated and/or delaminated prior to contacting with a dissolved inorganic component and then to be co-precipitated. The de-agglomeration of the biomass component can be achieved by the use of swelling agents and milling. This can be energy intensive and therefore costly. See for instance WO 2014/009517.

It is also possible to produce hybrid materials by co-milling of organic and inorganic species optionally in the presence of a solvent. Also in this process the energy consumption can be high and degradation of the organic components can occur due to the high friction and temperatures caused by milling. Therefore, often costly cooling (Liquid Nitrogen) needs to be applied.

An alternative to the use of swelling agent and milling to de-agglomerate biomass such as cellulose and/or lignin is the use of ionic liquid solvents. Most preferably a low-cost robust solvent like $ZnCl2$. See WO2017/055407.

It is a problem to have to first de-agglomerate and/or exfoliate the base inorganic and organic materials to the micron- or preferably sub-micron scale, then to achieve intimate mixing of the two or more components and then to form the desired, preferably homogeneous, hybrid material. It is the object of the invention to provide a process that does not have one or more of the aforementioned disadvantages of requiring expensive pretreatments.

BRIEF SUMMARY OF THE INVENTION

According to the invention there has been provided a process for the preparation of (homogeneous) hybrid inorganic-organic materials comprising solving and/or suspending and/or dispersing an inorganic and an organic material in an (ionic) liquid solvent and precipitating the dissolved/suspended/dispersed inorganic and organic materials together to form a hybrid inorganic-organic precipitate material.

The inventors thus have achieved to provide a process capable of mixing solid materials using certain ionic liquids to dissolve/suspend/disperse, preferably dissolve, the organic as well as the inorganic materials, which when precipitated will result in a homogeneous organic/inorganic hybrid material.

Dissolved in this context means that the material is not necessarily dissolved to molecular level but can also be dispersed very small particles (Colloid). Nevertheless, the product resulting from a dissolution step is herein also referred to as a solution even though the materials may not be molecularly dissolved. The organic and inorganic materials are dissolved in the ionic liquid to particles on submicron scale, nano-scale or can even be dissolved to molecular scale and form a homogeneously mixed structure on precipitation. Preferably the organic material(s) is truly dissolved in the ionic liquid in the process, while the inorganic material(s) is dissolved or suspended or dispersed in the ionic liquid.

The invention also relates to the organic/inorganic hybrid materials obtainable or obtained by a method according to the invention, in particular to shaped organic/inorganic hybrid materials, in particular fibers, films, shaped particles and articles, optionally carbonized, to the use of the organic/inorganic hybrid materials for the manufacture of or as a component in catalysts, sorbents, building and construction materials, packaging materials, paper materials, coatings and polymers and to a process for the peptization of metal-oxides in particular to the use of such materials, preferably in granular form, as a sorbent (granulate) for $CO2$ capture applications (in particular direct air capture by temperature/pressure swing methods).

BRIEF DESCRIPTION OF THE DRAWING

The features and advantages of the invention will be appreciated upon reference to the following drawings:

FIG. 1 is a schematic representation of a process of the invention wherein in a first step, an inorganic material ($A_i$) is contacted with an ionic Liquid (IL) to dissolve/suspend/disperse the inorganic material. In a second step, an organic material ($C_o$) is added to the product resulting from the previous step to also dissolve the organic material in the ionic liquid containing the dissolved inorganic material ([Ai/Co]). Optionally, more ionic liquid (IL) can be added in the second step. In a third step, an anti-solvent (AS) is added to precipitate the dissolved/suspended organic and inorganic material to form a homogeneous hybrid precipitate material (($A_i/C_o)_s$).

DETAILED DESCRIPTION OF THE INVENTION

The ionic liquid solvent preferably is a molten salt hydrate, preferably salt with a melting point below 200° C., preferably hydrates of inorganic salts, preferably zinc halides, calcium chloride or lithium chloride or combinations thereof, most preferably hydrates of $ZnCl_2$ optionally with minor amounts of other inorganic salt hydrates, wherein preferably the salt content in the salt hydrate is between 55 to 85 wt. % and most preferably the ionic liquid is substantially $ZnCl_2.4H_2O$.

The inorganic component preferably consists at least 80 wt. % of non-Carbon materials, preferably metal oxides that are preferably chosen from the group $Al_2O_3$, $SiO_2$, ZnO, $TiO_2$, FeO, $Fe_2O_3$ or combinations thereof, more preferably alumina, titanic or silica, most preferably gamma-alumina or boehmite. It is known in the art to achieve dissolution or fine dispersion (colloid formation) of metal-oxides by contacting with an acid, typically nitric acid, which is referred to in the art as peptization. The metal oxide can be partially peptised by contacting with acid before dissolution/dispersion in the ionic liquid. The process may also comprise peptizing a mixture of dispersed metal oxide material and organic material during dissolution in the ionic liquid by adding water and/or a base to the ionic liquid to increase the pH.

The organic component preferably consists of at least 80 wt. % Carbon, Hydrogen and Oxygen, preferably organic materials from bio-origin, preferably cellulose, hemi-cellulose, lignin or sugars or combinations thereof. The amount of organic component relative to the total amount of organic component and inorganic component preferably is between 5 and 95 wt. %, preferably 10 and 90 wt. %, more preferably 20-80 wt. %.

Inorganic materials are defined as materials consisting at least 80% of non-Carbon materials. Examples are Metals and Metal oxides such as $Al_2O_3$, $SiO_2$, ZnO, $TiO_2$, FeO, $Fe_2O_3$.

Organic materials are defined as materials consisting of at least 80% Carbon, Hydrogen and Oxygen. Examples are: Cellulose, Hemi-Cellulose, Lignin, Sugars or carbon obtained by carbonization thereof.

The dissolution/suspension/dispersion of the inorganic and the organic material can be carried out in different ways. A preferred way is to dissolve/suspend/disperse the inorganic and the organic material separately in a ionic liquid and then mix the resulting solutions/suspension/dispersion. The advantage is that the conditions for dissolving the inorganic and the organic materials can be separately optimized. However, more conveniently, the inorganic and the organic material are dissolved consecutively, meaning that one material is dissolved in the dissolution/suspension of the other component. What is least preferred is to contact inorganic and the organic material simultaneously with the ionic liquid.

The process preferably comprises
a) a first step wherein first the inorganic or the organic material is dissolved, suspended and/or dispersed in the ionic liquid solvent forming solution/suspension/dispersion A,
b) a second step wherein the other of the inorganic or organic material is dissolved, suspended and/or dispersed in the solution/suspension/dispersion A prepared in the first step, creating solution/suspension/dispersion B comprising a mixture of dissolved inorganic and organic materials,
c) Optionally adding additional ionic liquid (IL) solvent after the first step and before the second step or during addition of the inorganic or organic material into solution/suspension/dispersion A,
d) Optionally adding additional inorganic and/or organic materials and additional ionic liquid (IL) solvent to solution/suspension/dispersion B.
e) Optionally adding acid to reduce the pH in step A and/or B.

The precipitation in the ionic solution can be obtained by lowering the temperature, adding water, mechanical action, drying, adding an anti-solvent or combinations thereof. Preferably, the precipitation is obtained by adding to the ionic solution an anti-solvent selected from the group of a ketone, an ether, an alkanol an alkane-nitrile or combinations thereof, preferably the anti-solvent having from 1 to 10 carbon atoms, preferably 2-8, more preferably 4-6 carbon atoms.

In a preferred embodiment anti-solvent is added to the ionic solution and the ionic solution comprising the precipitate material is I) spun to shape the precipitate material in the form of fibers or II) granulated, for example in a fluid bed granulation, to shape the precipitate material in the form of particles.

The process may further comprise one or more further steps selected from drying, filtering, washing, sintering, calcining, shaping and in particular a step of carbonization (heating at high temperatures in absence of air, preferably to form elementary carbon, in particular active carbon domains).

A preferred embodiment of the process comprises a carbonization step wherein the organic component in the organic/inorganic hybrid precipitate material is carbonized to form a carbon homogeneous hybrid carbon—inorganic material. Carbonization is known in the art and in essence comprises heating at high temperatures in absence of air, in particular, in absence of oxygen. Here and hereafter, a carbonized organic material (herein also referred to as carbon material) is still considered an organic material and a carbonized organic/inorganic hybrid material is considered to be an organic/inorganic hybrid material according to the invention.

The invention also relates to a (homogenous) hybrid inorganic-organic material obtainable or obtained by the process of the invention described above, preferably comprising micro-dispersed domains of organic or inorganic material having an average diameter below 1000 nanometer, preferably below 700, 500 or even 300 nanometer or more preferably comprising nano-dispersed domains of organic or inorganic material having an average diameter between 10 and 300, preferably between 50 and 250, typically between 100 and 200 nanometer.

A preferred (homogenous) hybrid inorganic-organic material is a cellulose/metaloxide hybrid material, preferably a cellulose/alumina, titanic or silica hybrid material which is optionally carbonized to convert the organic material to carbon, preferably a carbon-alumina hybrid material.

The hybrid inorganic-organic material can be shaped, for example in the form of particles, fibers, films or shaped articles, for example granulated or prilled particles, extruded particles, optionally extruded particles shaped to increase surface area (for example tri- or quadru-lobe shaped particles, porpous particles) or shaped articles like honeycomb structures, films etc. The hybrid inorganic-organic material can also be applied to or adhered to a carrier substrate. The nature and relative amount of the inorganic particles can be chosen in view of the desired properties in the envisaged application.

The homogenous hybrid inorganic-organic material of the invention can be shaped in the form of a fiber comprising an organic component, preferably having cellulose or carbonized cellulose (active carbon) as the continuous phase, with dispersed domains of an inorganic component, preferably alumina to enhance properties like for example flame retardant properties. In fibers, the amount of inorganic material relative to the total of organic and inorganic material is preferably between 1-20 wt. %, more preferably between 2-15 wt. %. The balance in choosing the amount is to improve certain properties, for example flame retardancy, but maintain acceptable tensile properties.

It was found that the inorganic material can improve the strength (for example the crushing strength) of carbonised hybrid materials. In carbonized shaped hybrid material, the strength can be impacted by the carbonization of the organic material, but the inorganic material acts as binder and improves strength properties. For increasing the strength, it is preferred to use higher amounts of the inorganic material. Higher amounts can be used in particular in shaped particles.

Preferably, the amount of inorganic material relative to the total of organic and inorganic material can be between 1 and 95 wt. %, more preferably between 10 and 90 wt. %, even more preferably between 20 and 80 wt. %. The invention also relates to carbonized inorganic-organic hybrid material, preferably shaped particles, preferably comprising carbonized cellulose and metal-oxide, more preferably comprising carbonized cellulose and alumina, titania or silica.

The carbonized inorganic-organic hybrid materials are very useful for use in $CO_2$ capturing. For this purpose, the carbon in the hybrid material comprises a $CO_2$ adsorbent as known in the art, for example a potassium salt. The $CO_2$ adsorbent can be added to the organic material before shaping and carbonization or to the ready formed and carbonized shaped particle, for example by impregnation. For this purpose, it is preferred that the inorganic material is (at least partially) titania, as it has been observed that a potassium $CO_2$ adsorbent performs better on titania than on alumina.

The invention also and independently of the above relates to a process for the peptization of metal-oxides comprising dissolving/suspending/dispersing a metal-oxide as described above in a ionic liquid solvent as described above (preferably Zinc-chloride hydrate) and preferably precipitating the dissolved metal oxide. The advantage of the process compared to prior art processes using acid peptization, for example by nitric acid, is that the ionic liquid shows less corrosion problems. Peptisation to dispersed sub-micron particle sizes (even about 500 nm) can be obtained without using acid. In this process, good results are obtained without addition of acid or a base but some small amount of acid or a base may be added to aid peptization in the ionic liquid.

The hybrid inorganic-organic material can be carbonized and be an active carbon—metal oxide hybrid material, in particular for CO2 capture applications. Further it can be carbonized and be an active carbon—metal carbonate—metal oxide hybrid material, in particular for CO2 capture applications. The metal carbonate can be a potassium carbonate, or a sodium carbonate, and it can be introduced by soaking the carbonized material in a carbonate solution and drying the resultant material.

The invention also relates to the use of the hybrid inorganic-organic material for the manufacture of-, or as a component in-, catalysts, sorbents, building and construction materials, packaging materials, paper materials, coatings and polymers.

The invention also relates to the use of the inorganic-organic hybrid materials in electrical applications, wherein preferably the inorganic material is titanic. The process of the invention can be used to produce shaped organic/inorganic shaped materials having improved adhesion or porosity compared to cellulose shaped materials.

In a preferred embodiment, the process comprises a first step (step 1) an inorganic or an organic component is dissolved/suspended/dispersed in an ionic liquid (IL) solvent forming solution/suspension/dispersion A. In a second step (step 2) an inorganic or an organic component is dissolved/suspended/dispersed in the solution prepared in step 1, creating a solution/suspension/dispersion comprising a mixture of inorganic and organic materials (solution B). Optionally, additional ionic liquid (IL) solvent can be added after step 1 and before step 2 or during the addition of material into solution A. Optionally additional inorganic and/or organic materials and additional ionic liquid (IL) solvent can be added. The inorganic and organic materials together are separated from the ionic liquid, thereby forming a homogeneous hybrid inorganic-organic material. The separation from ionic Liquid can be achieved by adding an anti-solvent causing precipitation of both solid phases (co-precipitation) forming a homogenous hybrid material. Alternatively, the separation can be achieved by Spinning/Electro-spinning/HP Electro spinning with an anti-solvent and/or coagulant. The separation can also be separated by Drying, Extrusion/HP Extrusion.

Referring to FIG. 1, in a preferred embodiment of the process of the inventions, an alumina (gamma-alumina or boehmite) is peptized (dissolved/suspended/dispersed) making use of an ionic liquid acid such as $ZnCl_2.4H_2O$. Thereafter also cellulose is dissolved/suspended/dispersed, adding extra ionic liquid and/or acid if necessary to reduce the pH. The combined mixture of dispersed Alumina and Cellulose is thereafter peptized by adding water and or a base to increase the pH. The formed homogeneous hybrid material is thereafter dried and carbonized in the absence of air forming a homogeneous Carbon-Alumina Hybrid.

The foregoing material can be used to produce an improved attrition resistant catalyst or sorbent support. Alternatively, the foregoing material can be used to produced fibers with enhanced flame resistance properties.

Example A

A ZnCl2 solution was prepared consisting of 70% $ZnCl_2$ in water (70 g $ZnCl_2$ in 30 g water). 0.5 grams of Alumina (Condea Pural) were dissolved/suspended/dispersed (peptized) in 50 g of the prepared $ZnCl_2$ solution, forming stream A. Then 2.5 g grams of Cellulose (Cotton Linter) were dissolved/suspended/dispersed in 50 g of the prepared $ZnCl_2$ solution, forming stream B. Stream A and B are mixed together forming stream C. Water was added as anti-solvent to stream C (180 g water) and the cellulose and alumina co-precipitated forming a mixed hybrid material. The mixed hybrid material was tested in a TGA, which showed that the addition of Alumina to the Cellulose leads to a higher temperature of thermal decomposition (melting) and improved flame retardance.

Thus, the invention has been described by reference to certain embodiments discussed above. It will be recognized that these embodiments are susceptible to various modifications and alternative forms well known to those of skill in the art. For example, the ionic liquid may be modified by adding an acid and/or a base.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A process for the preparation of hybrid inorganic-organic materials comprising:
    at least one of dissolving, suspending and dispersing an inorganic material and an organic material in an ionic liquid solvent to form at least one of an ionic solution, suspension, and dispersion, wherein at least one of the inorganic material or the organic material is dissolved, and
    coprecipitating the inorganic material and the organic material together to form a hybrid inorganic-organic precipitate material,
    the process further comprising a carbonization step wherein the organic material in the precipitate material is carbonized to form a carbon homogeneous hybrid carbon-inorganic material.

2. The process of claim 1, wherein the ionic liquid solvent is a molten salt hydrate.

3. The process of claim 1, wherein the inorganic material consists at least 80 wt. % of non-Carbon materials.

4. The process of claim 1, wherein the organic material is comprised of at least 80 wt. % Carbon, Hydrogen and Oxygen.

5. The process of claim 1, wherein the amount of organic material relative to the total amount of organic and inorganic material is between 5 and 95 wt. %.

6. The process of claim 1 comprising
    a first step wherein first the inorganic or the organic material is at least one of dissolved, suspended and dispersed in the ionic liquid solvent forming at least one of a solution, suspension and dispersion A, and
    a second step wherein the other of the inorganic or organic material is at least one of dissolved, suspended and dispersed in the solution A prepared in the first step, creating at least one of a solution, suspension and dispersion B comprising a mixture of inorganic and organic materials.

7. The process of claim 1, wherein precipitation in the ionic solution/suspension/dispersion is obtained by at least one of lowering the temperature, adding water, mechanical action, drying, adding an anti-solvent or combinations thereof.

8. The process of claim 1, wherein precipitation is obtained by adding to the ionic solution/suspension/dispersion an anti-solvent selected from the group consisting of a ketone, an ether, an alkanol an alkane-nitrile or combinations thereof.

9. The process of claim 1, wherein anti-solvent is added to the ionic solution and the ionic solution comprising the precipitate material is
    I) spun to shape the precipitate material in the form of fibers or
    II) granulated to shape the precipitate material in the form of particles.

10. The process of claim 1, further comprising one or more further steps selected from the group consisting of drying, filtering, washing, sintering, calcining, shaping and carbonization.

11. The process of claim 1, wherein the precipitate material is carbonized to form an active carbon—metal oxide hybrid material.

12. The process of claim 1, wherein the precipitate material is carbonized to form an active carbon—metal carbonate—metal oxide hybrid material.

13. The process of claim 1, wherein the ionic liquid solvent is a molten salt hydrate with a melting point below 200° C.

14. The process of claim 1, wherein the ionic liquid solvent is a hydrate of an inorganic salt.

15. The process of claim 1, wherein the ionic liquid solvent is a hydrate of zinc halide, calcium chloride or lithium chloride or combinations thereof.

16. The process of claim 1, wherein the ionic liquid solvent is a hydrate of $ZnCl_2$, with minor amounts of other organic components and/or inorganic salt hydrates.

17. The process of claim 1, wherein the ionic liquid solvent is a salt hydrate, and wherein the salt content in the salt hydrate is between 55 to 85 wt. %.

18. The process of claim 1, wherein the ionic liquid solvent is substantially $ZnCl_2.4H_2O$.

19. The process of claim 1, wherein the inorganic material consists at least 80 wt. % of non-carbon materials, in the form of metal oxides that are chosen from the group $Al_2O_3$, $SiO_2$, ZnO, $TiO_2$, FeO, $Fe_2O_3$ or combinations thereof.

20. The process of claim 1, wherein the inorganic material is gamma-alumina or boehmite.

21. The process of claim 1, wherein the inorganic material is metal oxide which is peptised before or during dissolution/suspension/dispersion in the ionic liquid, by peptizing a mixture of the dispersed metal oxide and organic component by adding at least one of water and a base to increase the pH.

22. The process of claim 1, wherein the organic material consists of at least 80 wt. % carbon, hydrogen and oxygen, in the form of cellulose, hemi-cellulose, lignin or sugars or combinations thereof.

23. The process of claim 1, wherein the amount of organic material relative to the total amount of organic and inorganic material of the precursor mixture is between 10 and 90 wt. %.

24. The process of claim 6 comprising at least one of the additional steps
    adding additional ionic liquid (IL) solvent after step A and before step B or during addition of the inorganic or organic material into solution/suspension/dispersion A,
    adding additional inorganic and/or organic materials and additional ionic liquid (IL) solvent to solution/suspension/dispersion B,
    adding acid to reduce the pH in dissolving, suspending and/or dispersing step A and/or B.

25. The process of claim 1, wherein precipitation is obtained by adding to the ionic solution an anti-solvent selected from the group of a ketone, an ether, an alkanol an alkane-nitrile or combinations thereof, the anti-solvent having from 1 to 10 carbon atoms, or 4-6 carbon atoms.

26. The process of claim 9, wherein granulation of the precipitate material is performed by fluid bed granulation.

27. The process of claim 1, wherein the amount of organic material relative to the total amount of organic and inorganic material of the precursor mixture is between 20-80 wt. %.

* * * * *